United States Patent
Feige et al.

(10) Patent No.: US 12,551,472 B2
(45) Date of Patent: *Feb. 17, 2026

(54) COMPOSITIONS AND METHODS USING TRIGONELLINE TO PRODUCE INTRACELLULAR NICOTINAMIDE ADENINE DINUCLEOTIDE (NAD+) FOR TREATING OR PREVENTING PHYSIOLOGICAL DISORDERS OR STATES

(71) Applicant: SOCIETE DES PRODUITS NESTLE S.A., Vevey (CH)

(72) Inventors: Jerome Feige, Crissier (CH); Mathieu Membrez, Cugy (CH); Vincenzo Sorrentino, Lausanne (CH); Stefan Christen, Ecublens (CH); Maria Pilar Giner, Pully (CH); Sofia Moco, Lausanne (CH)

(73) Assignee: Societe des Produits Nestle S.A., Vevey (CH)

( * ) Notice: Subject to any disclaimer, the term of this patent is extended or adjusted under 35 U.S.C. 154(b) by 915 days.

This patent is subject to a terminal disclaimer.

(21) Appl. No.: 17/597,341

(22) PCT Filed: Jul. 3, 2020

(86) PCT No.: PCT/EP2020/068788
§ 371 (c)(1),
(2) Date: Jan. 4, 2022

(87) PCT Pub. No.: WO2021/004922
PCT Pub. Date: Jan. 14, 2021

(65) Prior Publication Data
US 2022/0249453 A1    Aug. 11, 2022

Related U.S. Application Data

(60) Provisional application No. 62/870,986, filed on Jul. 5, 2019.

(51) Int. Cl.
| | |
|---|---|
| *A61K 31/4425* | (2006.01) |
| *A61K 9/00* | (2006.01) |
| *A61K 36/48* | (2006.01) |
| *A61K 36/74* | (2006.01) |

(52) U.S. Cl.
CPC ........ *A61K 31/4425* (2013.01); *A61K 9/0053* (2013.01); *A61K 36/48* (2013.01); *A61K 36/74* (2013.01)

(58) Field of Classification Search
CPC ... A61K 31/4425; A61K 9/0053; A61K 36/48
See application file for complete search history.

(56) References Cited

FOREIGN PATENT DOCUMENTS

| | | |
|---|---|---|
| CA | 3145220 A1 | 1/2021 |
| CN | 102697781 | 10/2012 |
| CN | 102802626 A | 11/2012 |
| CN | 108014109 A | 5/2018 |
| EP | 0289639 | 11/1988 |
| JP | 2014501764 A | 1/2014 |
| WO | 2016016101 | 2/2016 |

OTHER PUBLICATIONS

Chinese Office Action for Appl No. 202080049063.X dated Jul. 29, 2023.
Frederick et al., "Loss of Nad Homeostasis Leads to Progressive and Reversible Degeneration of Skeletal Muscle", Cell Metabolism, vol. 24, Issue No. 2, 2016, pp. 269-282.
Japanese Office Action for Appl No. 2021-577008 dated Jul. 2, 2024, 4 pages.
European Office Action for Appl No. 20 736 991.9-1109 dated Jul. 26, 2024, 4 pages.
Mayakrishnan et al., "Fenugreek Seed Extract and its Phytocompounds—Trigonelline and Diosgenin Arbitrate their Hepatoprotective Effects Through Attenuation of Endoplasmic Reticulum Stress and Oxidative Stress in Type 2 Diabetic Rats", European Food Research & Technology, vol. 240, Issue No. 1, 2015, pp. 223-232.
Japanese Office Action for Appl No. 2021-577008 dated Nov. 19, 2024, 8 pages.
Taguchi et al., "Findings of Trigonelline Demethylating Enzyme Activity in Various Organisms and Some Properties of the Enzyme From Hog Liver", Biochemical and Biophysical Research Communications, Jun. 15, 1983, vol. 113, Issue No. 2, pp. 569-574.
Japanese Office Action for Appl No. 2021-577008 dated Jun. 3, 2025, 4 pages.
Canadian Office Action for Appl No. 3,145,853 dated Jun. 12, 2025, 6 pages.
Panda et al., "Trigonelline Isolated from Fenugreek Seed Protects against Isoproterenol-Induced Myocardial Injury through Down-Regulation of Hsp27 and aB-Crystallin", Nutrition, vol. 29, 2013, pp. 1395-1403.
Japanese Office Action for Appl No. 2021-577008 dated Nov. 25, 2025, 4 pages.

*Primary Examiner* — Kamal A Saeed
(74) *Attorney, Agent, or Firm* — K&L Gates LLP

(57) ABSTRACT

Compositions consist essentially of trigonelline or consist of trigonelline. The compositions can be used in food or beverage applications, pharmaceutical formulations, or as a dietary supplement. The compositions can be administered to a mammal to treat or prevent a mitochondria-related disease or a condition associated with altered mitochondrial function in an individual in need thereof or at risk thereof. The mitochondria-related disease or condition is selected from the group consisting of deleterious effects of aging, stress (e.g., oxidative stress), obesity, overweight, reduced metabolic rate, metabolic syndrome, diabetes mellitus, complications from diabetes, hyperlipidemia, neurodegenerative disease, cognitive disorder, stress-induced or stress-related cognitive dysfunction, mood disorder, anxiety disorder, age-related neuronal death or dysfunction, chronic kidney disease, kidney failure, trauma, infection, cancer, hearing loss, macular degeneration, myopathies and dystrophies, and combinations thereof.

9 Claims, 10 Drawing Sheets

A

B

A

B

A

Liver NAD⁺ content

B

Liver NAD⁺ content

C

Muscle NAD⁺ content

D

Muscle NAD⁺ content

A

B

Figure 7 C Spontaneous mobility (Distance Day8->Day11)
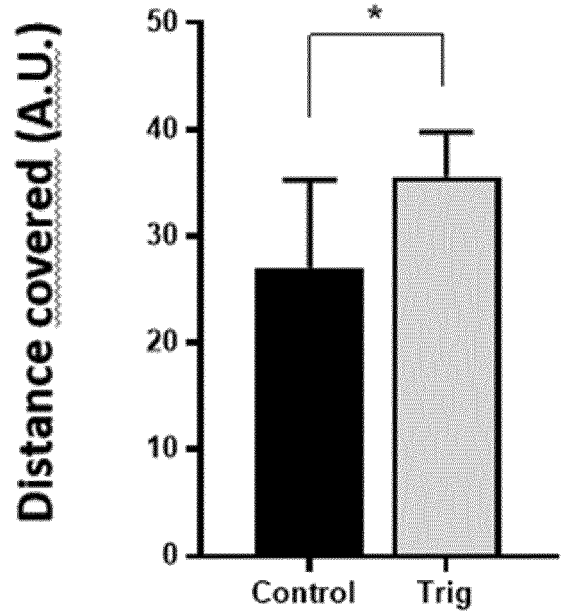
D Stimulated mobility score
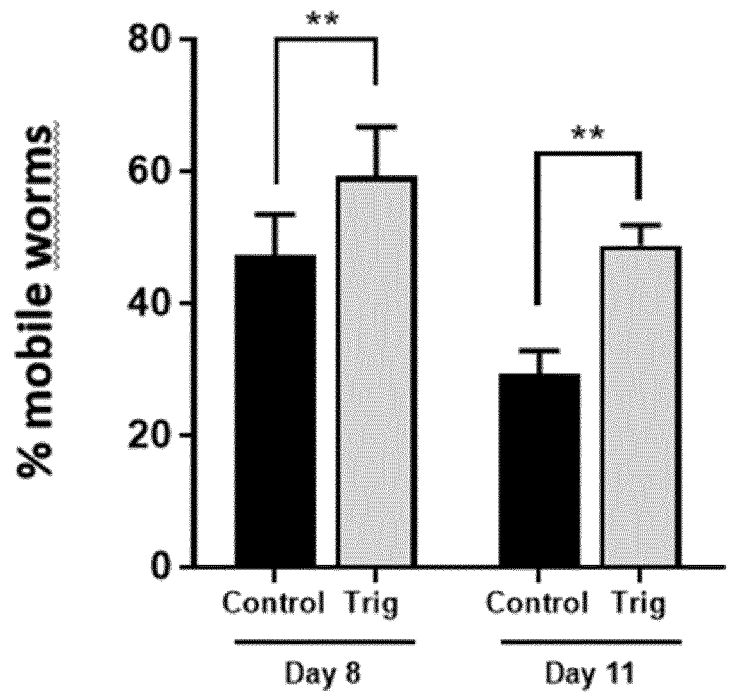

COMPOSITIONS AND METHODS USING TRIGONELLINE TO PRODUCE INTRACELLULAR NICOTINAMIDE ADENINE DINUCLEOTIDE (NAD$^+$) FOR TREATING OR PREVENTING PHYSIOLOGICAL DISORDERS OR STATES

CROSS REFERENCE TO RELATED APPLICATIONS

The present application is a National Stage of International Application No. PCT/EP2020/068788, filed on Jul. 3, 2020. which claims priority to U.S. Provisional Patent Application No. 62/870,986, filed on Jul. 5, 2019, the entire contents of which are being incorporated herein by reference.

BACKGROUND

The present disclosure generally relates to compositions and methods that use trigonelline to produce intracellular NAD$^+$/NADH. Intracellular levels of NAD+ can be increased in cells and tissues to improve cell and tissue survival and/or or overall cell and tissue health.

Nicotinic acid and nicotinamide are the vitamin forms of nicotinamide adenine dinucleotide (NAD$^+$). Eukaryotes can synthesize NAD$^+$ de novo via the kynurenine pathway from tryptophan, and niacin supplementation prevents the pellagra that can occur in populations with a tryptophan-poor diet. Nicotinic acid is phosphoribosylated to nicotinic acid mononucleotide (NaMN), which is then adenylylated to form nicotinic acid adenine dinucleotide (NaAD), which in turn is amidated to form NAD$^+$.

NAD$^+$ is an enzyme co-factor that is essential for the function of several enzymes related to reduction-oxidation reactions and energy metabolism. NAD$^+$ functions as an electron carrier in cell metabolism of amino acids, fatty acids, and carbohydrates. NAD$^+$ serves as an activator and substrate for sirtuins, a family of protein deacetylases that have been implicated in metabolic function and extended lifespan in lower organisms. The co-enzymatic activity of NAD$^+$, together with the tight regulation of its biosynthesis and bioavailability, makes it an important metabolic monitoring system that is clearly involved in the aging process.

SUMMARY

The present disclosure provides a composition consisting essentially of trigonelline or consisting of trigonelline. In some embodiments, at least a portion of the trigonelline is provided by a plant extract in the composition, such as one or more of a coffee extract, a hemp extract, a pumpkin seed extract and/or a fenugreek seed extract, for example a plant extract enriched in trigonelline.

In a preferred embodiment, at least a portion of trigonelline is provided from a fenugreek extract.

In some embodiments, at least a portion of the trigonelline is provided from an algae source, for example, a Laminariaceae extract.

In an embodiment, the composition is selected from the group consisting of a food product, a food supplement, an oral nutritional supplement (ONS), a medical food, and combinations thereof.

In another embodiment, the present disclosure provides a method of treating or preventing (e.g., reducing incidence and/or severity) a mitochondria-related disease or a condition associated with altered mitochondrial function in an individual in need thereof or at risk thereof. The method comprises orally administering to the individual a composition consisting essentially of trigonelline or consisting of trigonelline in an amount effective to increase NAD$^+$ biosynthesis.

The mitochondria-related disease or condition can be selected from the group consisting of deleterious effects of aging, stress (e.g., oxidative stress), obesity, overweight, reduced metabolic rate, metabolic syndrome, diabetes mellitus, complications from diabetes, hyperlipidemia, neurodegenerative disease, cognitive disorder, stress-induced or stress-related cognitive dysfunction, mood disorder, anxiety disorder, age-related neuronal death or dysfunction, chronic kidney disease, kidney failure, trauma, infection, cancer, hearing loss, macular degeneration, myopathies and dystrophies, and combinations thereof.

The increase in NAD$^+$ biosynthesis can provide one or more benefits to the individual, for example a human (e.g., a human undergoing medical treatment), a pet or a horse (e.g., a pet or horse undergoing medical treatment), or cattle or poultry (e.g., cattle or poultry being used in agriculture). Preferably, the NAD$^+$ biosynthesis is increased in one or more cells of the mammal, for example one or more cells that are part of at least one body part selected from the group consisting of a liver, a kidney, a brain, and a skeletal muscle.

In an embodiment, the composition is administered enterally.

In an embodiment, the composition is selected from the group consisting of a food product, a food supplement, an oral nutritional supplement (ONS), a medical food, and combinations thereof.

In another embodiment, the present disclosure provides a unit dosage form of a composition consisting essentially of trigonelline or consisting of trigonelline, the unit dosage form contains an amount of the trigonelline effective to treat or prevent (e.g., reducing incidence and/or severity) a mitochondria-related disease or a condition associated with altered mitochondrial function in an individual in need thereof or at risk thereof. The composition can be selected from the group consisting of a food product, a food supplement, an oral nutritional supplement (ONS), a medical food, and combinations thereof.

In another embodiment, the present disclosure provides a method of promoting neurite outgrowth. The method comprises orally administering to an individual a composition consisting essentially of trigonelline or consisting of trigonelline in an amount effective to increase NAD$^+$ biosynthesis in one or more cells (e.g., one or more cells that are part of at least one body part selected from the group consisting of a liver, a kidney, a brain, and a skeletal muscle), for example an amount effective to treat or prevent (e.g., reducing incidence and/or severity) a mitochondria-related disease or a condition associated with altered mitochondrial function in an individual in need thereof or at risk thereof.

An advantage of one or more embodiments provided by the present disclosure is to potentiate benefits on oxidative metabolism and prevent DNA damage.

Another advantage of one or more embodiments provided by the present disclosure is to replenish NAD$^+$ pools, which decline with age.

Yet another advantage of one or more embodiments provided by the present disclosure is to help off-set slowing of the metabolism associated with aging.

Another advantage of one or more embodiments provided by the present disclosure is to help increase fatty acids metabolism.

Yet another advantage of one or more embodiments provided by the present disclosure is to help the body to metabolize fat and increase lean body mass.

Another advantage of one or more embodiments provided by the present disclosure is to help maintain heart health.

Yet another advantage of one or more embodiments provided by the present disclosure is to help support healthy LDL-cholesterol and fatty acid levels in the blood.

Another advantage of one or more embodiments provided by the present disclosure is to treat or prevent neurodegeneration, such as age-related neurodegeneration, and/or promote neurite outgrowth.

Additional features and advantages are described in, and will be apparent from, the following Detailed Description and the Figures.

BRIEF DESCRIPTION OF DRAWINGS

FIG. 1A shows the enzymatic quantification of NAD+ concentration in Human Skeletal Muscle Myotubes (HSMM) treated for 6 h with trigonelline in doses 5 µM, 50 µM, 500 µM and 1 mM.

FIG. 1B shows the enzymatic quantification of NAD+ concentration in zebrafish larvae (DPF4) treated for 16 h with trigonelline in doses 500 µM and 1 mM. #, * indicate difference from the control, One-way ANOVA, with $p<0.1$, $p<0.05$. Data are presented as Mean+/−SEM.

FIG. 2A shows the NAD+ relative concentration in Human Skeletal Muscle Myotubes (HSMM) from 2 different donors treated for 6 h with trigonelline at dose 500 µM relative to control, measured by liquid chromatography-mass spectrometry (LC-MS).

FIG. 2B shows the fractional labelling of NAD+(13C-carbonyl) ($\Sigma i. \, m_i/(n. \, \Sigma m_i)$, i=isotopologue, and m the abundance of an isotopologue), corrected for natural abundance and normalized to maximal incorporation, expressed in percentage, upon 6 h-treatment with 500 µM of isotopically labelled trigonelline (13C-carbonyl, C2H3), relative to control, measured by LC-MS.

FIG. 2C shows the structure of the trigonelline stable isotopic tracer (13C-carbonyl, C2H3) used to assess label incorporation into NAD+(13C-carbonyl), highlighting isotopically labelled atoms (D corresponds to deuterium or 2H and 13C corresponds to carbon-13) in both structures. , ** indicate difference from the respective control, unpaired t-test, with $p<0.01$, $p<0.0001$, respectively. Data are presented as Mean+/−SEM (n=3).

FIG. 4A shows Human Skeletal Muscle Myotubes (HSMM) treated for 16 h with synthetic trigonelline monohydrate at different doses and quantification of NAD+.

FIG. 4B shows Human Skeletal Muscle Myotubes (HSMM) treated for 16 h with a fenugreek seed extract enriched in trigonelline (40.45% trigonelline) at different doses and quantification of NAD+.

*,, ** indicate difference from the control, One-way ANOVA, with $p<0.05$, $p<0.01$, $p<0.001$, respectively. Data are presented as Mean+/−SD.

Figure 5:
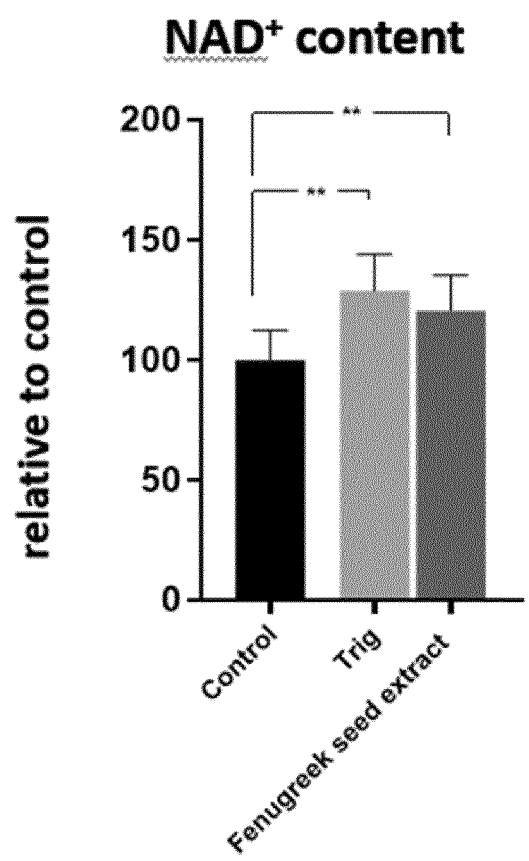

FIG. 5—Liver NAD+ levels of C57BL/6JRj mice measured 120 minutes after administration of 300 mg/kg trigonelline chloride or an equimolar amount of fenugreek seed extract by oral gavage.

Figure 6:
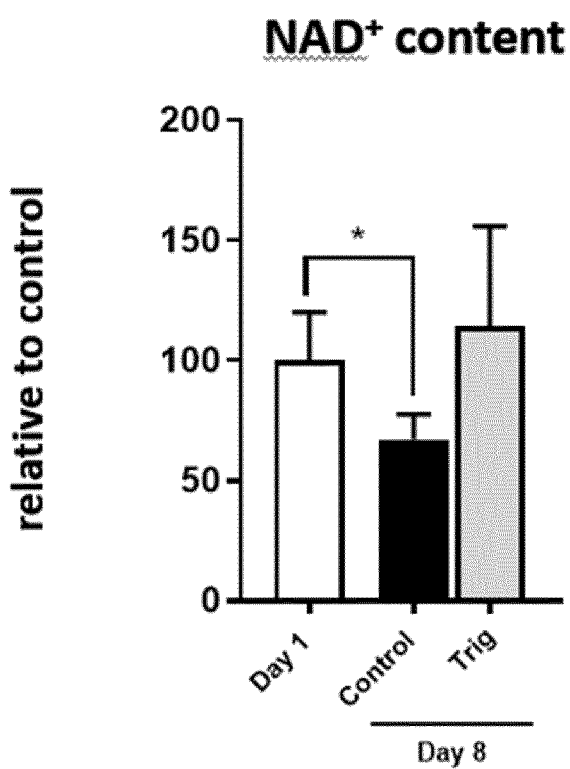

*,, ** indicate difference from the control, One-way ANOVA, with $p<0.05$, $p<0.01$, $p<0.001$, respectively. Data are presented as Mean+/−SD FIG. 6—C. elegans whole-lysate NAD+ levels measured in Day 1 adult animals, and in Day 8 aged worms treated with 1 mM trigonelline chloride, compared to their age-matched controls.

*,, ** indicate difference from the control, One-way ANOVA, with $p<0.05$, $p<0.01$, $p<0.001$, respectively. Data are presented as Mean+/−SD.

Figure 7:
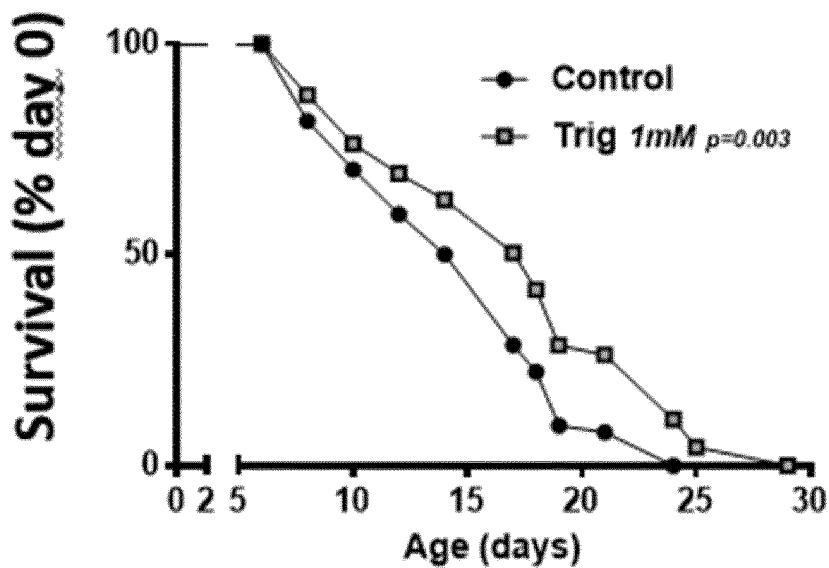
Figure 7:
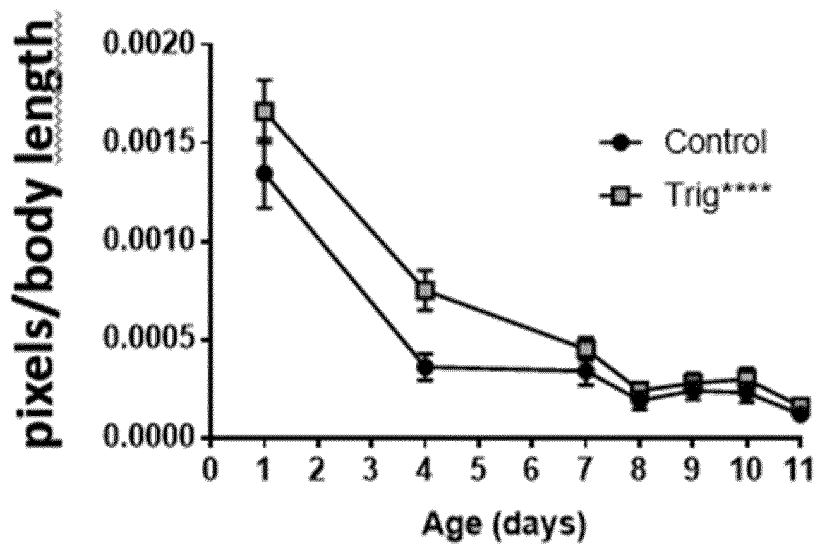

FIG. 7—C. elegans survival, mean speed, distance and mobility

FIG. 7A—Survival curve of C. elegans treated with 1 mM trigonelline chloride increases lifespan by 21%.

FIG. 7B—Mean speed measured during spontaneous mobility assay performed from day 1 adulthood in 1 mM trigonelline chloride treated worms compared to controls.

FIG. 7C—Distance travelled during the spontaneous mobility assay in advanced aging phase.

FIG. 7D Stimulated mobility score assessed for day 8 and day 11 old worms indicate the percentage of worms responsive to a physical stimulus.

*,** indicate difference from the control, Student test, with $p<0.05$, $p<0.01$, respectively.

For FIGS. 7A & D, data are presented as Mean+/−SD.

For FIGS. 7B & C, data are presented as Mean+/−SEM.

Figure 8:
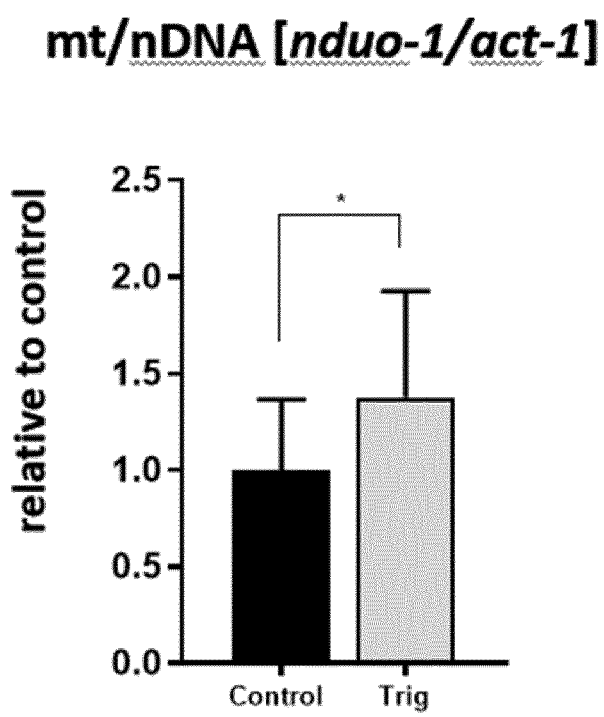

FIG. 8—C. elegans mitochondrial to nuclear DNA ratio (mt/nDNA)

FIG. 8 shows the ratio of a mitochondrial-encoded gene (nduo-1) represented as relative to a nuclear-encoded gene (act-1) in day 8 old worms. *indicate difference from the control, Student test, with $p<0.05$. Data are presented as Mean+/−SD

DETAILED DESCRIPTION

Definitions

Some definitions are provided hereafter. Nevertheless, definitions may be located in the "Embodiments" section below, and the above header "Definitions" does not mean that such disclosures in the "Embodiments" section are not definitions.

All percentages expressed herein are by weight of the total weight of the composition unless expressed otherwise. As used herein, "about," "approximately" and "substantially" are understood to refer to numbers in a range of numerals, for example the range of −10% to +10% of the referenced number, preferably −5% to +5% of the referenced number, more preferably −1% to +1% of the referenced number, most preferably −0.1% to +0.1% of the referenced number.

All numerical ranges herein should be understood to include all integers, whole or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

As used in this disclosure and the appended claims, the singular forms "a," "an" and "the" include plural referents unless the context clearly dictates otherwise. Thus, for example, reference to "a component" or "the component" includes two or more components.

The words "comprise," "comprises" and "comprising" are to be interpreted inclusively rather than exclusively. Likewise, the terms "include," "including" and "or" should all be construed to be inclusive, unless such a construction is clearly prohibited from the context. Nevertheless, the compositions disclosed herein may lack any element that is not specifically disclosed herein. Thus, a disclosure of an embodiment using the term "comprising" includes a disclosure of embodiments "consisting essentially of" and "consisting of" the components identified. Any embodiment disclosed herein can be combined with any other embodiment disclosed herein.

The term "and/or" used in the context of "X and/or Y" should be interpreted as "X," or "Y," or "X and Y." Similarly, "at least one of X or Y" should be interpreted as "X," or "Y," or "X and Y." For example, "at least one of obesity or diabetes" should be interpreted as "obesity," or "diabetes," or "both obesity and diabetes."

Where used herein, the terms "example" and "such as," particularly when followed by a listing of terms, are merely exemplary and illustrative and should not be deemed to be exclusive or comprehensive. As used herein, a condition "associated with" or "linked with" another condition means the conditions occur concurrently, preferably means that the conditions are caused by the same underlying condition, and most preferably means that one of the identified conditions is caused by the other identified condition.

The terms "food," "food product" and "food composition" mean a product or composition that is intended for ingestion by an individual such as a human and provides at least one nutrient to the individual. A food product typically includes at least one of a protein, a lipid, a carbohydrate and optionally includes one or more vitamins and minerals. The compositions of the present disclosure, including the many embodiments described herein, can comprise, consist of, or consist essentially of the elements disclosed herein, as well as any additional or optional ingredients, components, or elements described herein or otherwise useful in a diet.

As used herein, the term "isolated" means removed from one or more other compounds or components with which the compound may otherwise be found, for example as found in nature. For example, "isolated" preferably means that the identified compound is separated from at least a portion of the cellular material with which it is typically found in nature. In an embodiment, an isolated compound is free from any other compound.

"Prevention" includes reduction of risk, incidence and/or severity of a condition or disorder. The terms "treatment," "treat" and "to alleviate" include both prophylactic or preventive treatment (that prevent and/or slow the development of a targeted pathologic condition or disorder) and curative, therapeutic or disease-modifying treatment, including therapeutic measures that cure, slow down, lessen symptoms of, and/or halt progression of a diagnosed pathologic condition or disorder; and treatment of patients at risk of contracting a disease or suspected to have contracted a disease, as well as patients who are ill or have been diagnosed as suffering from a disease or medical condition. The term does not necessarily imply that a subject is treated until total recovery. The terms "treatment" and "treat" also refer to the maintenance and/or promotion of health in an individual not suffering from a disease but who may be susceptible to the development of an unhealthy condition. The terms "treatment," "treat" and "to alleviate" are also intended to include the potentiation or otherwise enhancement of one or more primary prophylactic or therapeutic measure. The terms "treatment," "treat" and "to alleviate" are further intended to include the dietary management of a disease or condition or the dietary management for prophylaxis or prevention a disease or condition. A treatment can be patient- or doctor-related.

The term "unit dosage form," as used herein, refers to physically discrete units suitable as unitary dosages for human and animal subjects, each unit containing a predetermined quantity of the composition disclosed herein in an amount sufficient to produce the desired effect, in association with a pharmaceutically acceptable diluent, carrier or vehicle. The specifications for the unit dosage form depend on the particular compounds employed, the effect to be achieved, and the pharmacodynamics associated with each compound in the host.

As used herein, an "effective amount" is an amount that prevents a deficiency, treats a disease or medical condition in an individual, or, more generally, reduces symptoms, manages progression of the disease, or provides a nutritional, physiological, or medical benefit to the individual. The relative terms "improve," "increase," "enhance," "promote" and the like refer to the effects of the composition disclosed herein, namely a composition comprising trigonelline, relative to a composition not having trigonelline but otherwise identical. As used herein, "promoting" refers to enhancing or inducing relative to the level before administration of the composition disclosed herein.

A "subject" or "individual" is a mammal, preferably a human. The term "elderly" in the context of a human means an age from birth of at least 60 years, preferably above 63 years, more preferably above 65 years, and most preferably above 70 years. The term "older adult" in the context of a human means an age from birth of at least 45 years, preferably above 50 years, more preferably above 55 years, and includes elderly individuals.

"Overweight" is defined for a human as a body mass index (BMI) between 25 and 30 $kg/m^2$. "Obese" is defined for a human as a BMI of at least 30 $kg/m^2$, for example 30-39.9 $kg/m^2$. "Weight loss" is a reduction of the total body weight. Weight loss may, for example, refer to the loss of total body mass in an effort to improve one or more of health, fitness or appearance.

"Diabetes" encompasses both the type I and type II forms of the disease. Non-limiting examples of risk factors for diabetes include: waistline of more than 40 inches for men or 35 inches for women, blood pressure of 130/85 mmHg or higher, triglycerides above 150 mg/dl, fasting blood glucose greater than 100 mg/dl or high-density lipoprotein of less than 40 mg/dl in men or 50 mg/dl in women.

As used herein, the term "metabolic syndrome" refers to a combination of medical disorders that, when occurring together, increase the risk of developing cardiovascular disease and diabetes. It affects one in five people in the United States and prevalence increases with age. Some studies have shown the prevalence in the United States to be an estimated 25% of the population. In accordance with the International Diabetes Foundation consensus worldwide definition (2006), metabolic syndrome is central obesity plus any two of the following:

Raised triglycerides: >150 mg/dL (1.7 mmol/L), or specific treatment for this lipid abnormality;

Reduced HDL cholesterol: <40 mg/dL (1.03 mmol/L) in males, <50 mg/dL (1.29 mmol/L) in females, or specific treatment for this lipid abnormality;

Raised blood pressure: systolic BP>130 or diastolic BP>85 mm Hg, or treatment of previously diagnosed hypertension; and Raised fasting plasma glucose: (FPG)>100 mg/dL (5.6 mmol/L), or previously diagnosed type 2 diabetes.

As used herein, "neurodegenerative disease" or "neurodegenerative disorder" refers to any condition involving progressive loss of functional neurons in the central nervous system. In an embodiment, the neurodegenerative disease is associated with age-related cell death. Non-limiting examples of neurodegenerative diseases include mild cognitive impairment, Alzheimer's disease, Parkinson's disease, Huntington's disease, amyotrophic lateral sclerosis (also known as ALS and as Lou Gehrig's disease), peripheral neuropathy, AIDS dementia complex, adrenoleukodystrophy, Alexander disease, Alper's disease, ataxia telangiectasia, Batten disease, bovine spongiform encephalopathy (BSE), Canavan disease, corticobasal degeneration, Creutzfeldt-Jakob disease, dementia with Lewy bodies, fatal familial insomnia, frontotemporal lobar degeneration, Kennedy's disease, Krabbe disease, Lyme disease, Machado-Joseph disease, multiple sclerosis, multiple system atrophy, neuroacanthocytosis, Niemann-Pick disease, Pick's disease, primary lateral sclerosis, progressive supranuclear palsy, Refsum disease, Sandhoff disease, diffuse myelinoclastic sclerosis, spinocerebellar ataxia, subacute combined degeneration of spinal cord, tabes dorsalis, Tay-Sachs disease, toxic encephalopathy, transmissible spongiform encephalopathy, and wobbly hedgehog syndrome. The present disclosure is not limited to a specific embodiment of the neurodegenerative disease, and the neurodegenerative disease can be any neurologically-related condition known to one skilled in this art.

As used herein, "cognitive function" refers to any mental process that involves symbolic operations, e.g., perception, memory, attention, speech comprehension, speech generation, reading comprehension, creation of imagery, learning, and reasoning, preferably at least memory.

Methods for measuring cognitive function are well-known and can include, for example, individual or battery tests for any aspect of cognitive function. One such test is the Prudhoe Cognitive Function Test by Margallo-Lana et al. (2003) J. Intellect. Disability Res. 47:488-492. Another such test is the Mini Mental State Exam (MMSE), which is designed to assess orientation to time and place, registration, attention and calculation, recall, language use and comprehension, repetition, and complex commands. Folstein et al. (1975) J. Psych. Res. 12:189-198. Such tests can be used to assess cognitive function in an objective manner, so that changes in cognitive function, for example in response to treatment in accordance with methods disclosed herein, can be measured and compared.

As used herein, a "cognitive disorder" refers to any condition that impairs cognitive function. Non-limiting examples of a cognitive disorder include delirium, dementia, learning disorder, attention deficit disorder (ADD), and attention deficit hyperactivity disorder (ADHD).

As used herein, a "neurite" refers to any projection from the cell body of a neuron, such as an axon or a dendrite. The term is frequently used when speaking of immature or developing neurons, especially of cells in culture, because axons can be difficult to differentiate from dendrites before differentiation is complete. Neurites are often packed with microtubule bundles, the growth of which is stimulated by nerve growth factor (NGF), as well as tau proteins, microtubule associated protein 1 (MAP1), and microtubule associated protein 2 (MAP2). The neural cell adhesion molecule N-CAM simultaneously combines with another N-CAM and a fibroblast growth factor receptor to stimulate the tyrosine kinase activity of that receptor to induce the growth of neurites.

As used herein, "trigonelline" is any compound comprising 1-methylpyridin-1-ium-3-carboxylate including, for example, any salt thereof (e.g., Chloride or Iodide salt) and/or a form in which the ring therein may be reduced.

In some embodiments, trigonelline is represented by the structure of formula 1, being able to establish a salt with an anion (X—), such as a halogen, for example, iodide or chloride. The structure of formula 1 is also known as 3-carboxy-1-methylpyridinium, N-Methylnicotinic acid, 1-methylpyridine-3-carboxylic acid, 1-methylpyridin-1-ium-3-carboxylic acid, Pyridinium 3-carboxy-1-methyl-hydroxide inner salt (8CI), 1-methylnicotinic acid, Pyridinium 3-carboxy-1-methyl-.

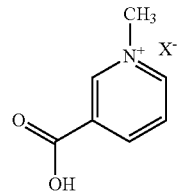

1

In some embodiments, trigonelline is represented by the structure of formula 2 in its inner salt form. The structure of formula 2 is also known as Caffearine, Gynesine, N-Methylnicotinate, Trigenolline, Coffearine, Trigonellin, Coffearin, Betain nicotinate, Betaine nicotinate, 1-methylpyridinium-3-carboxylate, Nicotinic acid N-methylbetaine, 1-Methylpyridinio-3-carboxylate, 1-Methyl-3-pyridiniumcarboxylate, N-Methylnicotinic acid, Trigenelline, Caffearin, 3-Carboxy-1-methylpyridinium hydroxide inner salt, N'-Methylnicotinate, 1-methylpyridin-1-ium-3-carboxylate, 3-Carboxy-1-methylpyridinium hydroxide inner salt, Pyridinium 3-carboxy-1-methyl-hydroxide inner salt, 1-methylpyridine-3-carboxylic acid, 1-methylpyridin-1-ium-3-carboxylic acid, 1-methylnicotinate, Trigonelline (S), N-methyl-nicotinate, Pyridinium 3-carboxy-1-methyl-hydroxide inner salt (8CI), N'-Methylnicotinic acid, N-Methylnicotinic acid betaine, Nicotinic acid N-methylbetaine, 1-Methyl-Nicotinic Acid Anion, Pyridinium 3-carboxy-1-methyl-inner salt, 1-Methyl-5-(oxylatocarbonyl)pyridinium-3-ide, Pyridinium 3-carboxy-1-methyl-inner salt, 3-carboxy-1-methyl-Pyridinium hydroxide inner salt.

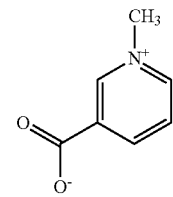

2

In some embodiments, optionally "trigonelline" can include metabolites and pyrolysis products thereof, such as nicotinamide, nicotinamide riboside, 1-methylnicotinamide, 1-methyl-2-pyridone-5-carboxamide (Me2PY), 1-methyl-4-pyridone-5-carboxamide (Me4PY), and alkyl-pyridiniums, such as 1-methyl-pyridinium (NMP) and 1,4-dimethylpyridinium; although as noted later herein, some embodiments exclude one or more of these metabolites and pyrolysis products of trigonelline.

EMBODIMENTS

The present disclosure provides compositions consisting essentially of trigonelline and compositions consisting of trigonelline. Another aspect of the present disclosure is a unit dosage form of a composition consisting essentially of or consisting of trigonelline, and the unit dosage form contains the trigonelline in an amount effective to treat or prevent (e.g., reducing incidence and/or severity) a mitochondria-related disease or a condition associated with altered mitochondrial function in an individual in need thereof or at risk thereof. The method comprises orally administering to the individual a composition consisting essentially of trigonelline or consisting of trigonelline in an amount effective to increase $NAD^+$ biosynthesis.

The mitochondria-related disease or condition can be selected from the group consisting of deleterious effects of aging, stress, obesity, overweight, reduced metabolic rate, metabolic syndrome, diabetes mellitus, complications from diabetes, hyperlipidemia, neurodegenerative disease, cognitive disorder, stress-induced or stress-related cognitive dysfunction, mood disorder, anxiety disorder, age-related neuronal death or dysfunction, chronic kidney disease, kidney failure, trauma, infection, cancer, hearing loss, macular degeneration, myopathies and dystrophies, and combinations thereof.

The increase in $NAD^+$ biosynthesis can provide one or more benefits to the individual, for example a human (e.g., a human undergoing medical treatment), a pet or a horse (e.g., a pet or horse undergoing medical treatment), or cattle or poultry (e.g., cattle or poultry being used in agriculture). Preferably, the $NAD^+$ biosynthesis is increased in one or more cells of the mammal, for example one or more cells that are part of at least one body part selected from the group consisting of a liver, a kidney, a brain, and a skeletal muscle. In some embodiments, the composition is administered to an older adult or an elderly individual.

The composition can comprise a pharmacologically effective amount of trigonelline in a pharmaceutically suitable carrier. In aqueous liquid compositions, the trigonelline concentration preferably ranges from about 0.05 wt. % to about 4 wt. %, or from about 0.5 wt. % to about 2 wt. % or from about 1.0 wt. % to about 1.5 wt. % of the aqueous liquid composition.

In particular embodiments, the method is a treatment that augments the plasma trigonelline for example to a level in the range of 50 to 6000 nmol/L plasma, preferably 100 to 6000 nmol/L plasma. The method can comprise administering daily trigonelline in the weight range of 0.05 mg-1 g per kg body weight, preferably 1 mg-200 mg per kg body weight, more preferably 5 mg-150 mg per kg body weight, even more preferably 10 mg-120 mg per kg body weight, or most preferably 40 mg-80 mg per kg body weight.

For non-human mammals such as rodents, some embodiments comprise administering an amount of the composition that provides 1.0 mg to 1.0 g of the trigonelline/kg of body weight of the non-human mammal, preferably 10 mg to 500 mg of the trigonelline/kg of body weight of the non-human mammal, more preferably 25 mg to 400 mg of the trigonelline/kg of body weight of the mammal, most preferably 50 mg to 300 mg of the trigonelline/kg of body weight of the non-human mammal.

For humans, some embodiments comprise administering an amount of the composition that provides 1.0 mg to 10.0 g of the trigonelline/kg of body weight of the human, preferably 10 mg to 5.0 g of the trigonelline/kg of body weight of the human, more preferably 50 mg to 2.0 g of the trigonelline/kg of body weight of the human, most preferably 100 mg to 1.0 g of the trigonelline/kg of body weight of the human.

In some embodiments, at least a portion of the trigonelline is isolated. Additionally or alternatively, at least a portion of trigonelline can be chemically synthesized.

In one embodiment, the composition comprises trigonelline which is chemically synthesized which is at least about 90% trigonelline, preferably at least about 98% trigonelline.

In a preferred embodiment, at least a portion of the trigonelline is provided by a plant or algae extract, for example an extract from one or more of coffee bean (e.g., a green coffee extract), Japanese radish, fenugreek seed, garden pea, hemp seed, oats, potato, dahlia, *Stachys* species, *Strophanthus* species, *Laminariaceae* species (especially *Laminaria* and *Saccharina*), *Postelsia palmaeformis*, *Pseudochorda nagaii*, *Akkesiphycus* or *Dichapetalum cymosum*. The plant extract is preferably enriched in trigonelline, i.e., the starting plant material comprises one or more other compounds in addition to the trigonelline, and the enriched plant material has a ratio of the trigonelline relative to at least one of the one or more other compounds that is higher than the ratio in the starting plant material.

Therefore, some embodiments of the composition comprise plant sources and/or enriched plant sources that provide at least a portion of the trigonelline in the composition.

In a preferred embodiment, the composition comprises enriched fenugreek extract which provides at least about 25-50% trigonelline in the composition. In a more preferred embodiment, the composition comprises enriched fenugreek extract which provides at least about 28-40% trigonelline.

As used herein, a "composition consisting essentially of trigonelline" contains trigonelline and is substantially free or completely free of any additional compound that affects $NAD^+$ production other than the trigonelline. In a particular non-limiting embodiment, the composition consists of the trigonelline and one or more excipients.

In some embodiments, the composition consisting essentially of trigonelline is optionally substantially free or completely free of other $NAD^+$ precursors, such as one or more of trigonelline derivatives; metabolites and pyrolysis products of trigonelline, such as nicotinamide, nicotinamide riboside, 1-methylnicotinamide, 1-methyl-2-pyridone-5-carboxamide (Me2PY), 1-methyl-4-pyridone-5-carboxamide (Me4PY), and alkyl-pyridiniums, such as 1-methyl-pyridinium and 1,4-dimethylpyridinium; nicotinic acid ("niacin"); or L-tryptophan.

In some embodiments, the composition consisting essentially of trigonelline is optionally substantially free or completely free of one or more of glycine; functional derivatives of glycine; N-acetylcysteine; or functional derivatives of N-acetylcysteine.

In some embodiments, the composition consisting essentially of trigonelline is optionally substantially free or completely free of one or more of chlorogenic acid; anthocyanins; 25-hydroxyvitamin D3; poly(ADP-ribose) polymerase (PARP-1) inhibitor compounds; pipecolic acid; myo-inositol; piperidine-2-carboxylic acid; tartaric acid; mannite; renieratene; adenine; uronic acid (UA); adenine; uracil; frideline; nicotinamide riboside; or a-amyrine.

In some embodiments, the composition consisting essentially of trigonelline is optionally substantially free or completely free of ketones and ketone precursors, such as medium chain triglycerides (MCTs); MCT derivatives; ketone esters such as mono-esters, e.g., (R)-3-hydroxybutyl-(R)-3-hydroxybutyrate and aceto-acetate diesters (e.g., R,S-1,3-butanediol acetoacetate diester; ketone salts; BHB (β-Hydroxybutyrate) and salts thereof such as sodium salts, magnesium salts, potassium salts, calcium salts and combinations thereof; D-BHB and salts thereof such as sodium salts, magnesium salts, potassium salts, calcium salts and combinations thereof; β-hydroxypentanoate and salts thereof such as sodium salts, magnesium salts, potassium salts, calcium salts and combinations thereof; D-β-hydroxypentanoate and salts thereof such as sodium salts, magnesium salts, potassium salts, calcium salts and combinations thereof; β-ketopentanoate and salts thereof such as sodium salts, magnesium salts, potassium salts, calcium salts and combinations thereof; hexanoyl ethyl βl-hydroxybutyrate; octanoyl ethyl β-hydroxybutyrate; hexanoyl hexyl β-hydroxybutyrate; aceto-acetate (AcA) and salts thereof such as sodium salts, magnesium salts, potassium salts, calcium salts and combinations thereof; and mixtures thereof. MCTs comprise three fatty acid moieties, each of which independently has between 6-12, 6-11, 6-10, 7-12, 7-11, 7-10, 8-12, 8-11 or 8-10 carbon atoms.

In some embodiments, the composition consisting essentially of trigonelline is optionally substantially free or completely free of one or more of 4-hydroxyisoleucine; acetylcholine; 25-alpha-spirosta-3,5-diene; 3,4,7-trimethylcoumarin; 3-hydroxy-4,5-dimethyl-2-furanone; 4-hydroxyisoleucine-lactone; 4-methyl-7-acetoxycoumarin; 7-acetoxy-4-methylcoumarin; alpha-galactosidase; alpha-mannosidase; aluminum; arabinose; arachidic-acid; behenic acid; beta-carotene; beta-mannanan; beta-sitosterol; biotin; carpaine; choline; coumarin; cyanocobalamin; d-mannose; digalactosylmyoinositol; dihydroactinidiolide, dihydrobenzofuran; dioscin; diosgenin; elemene; endo-beta-mannanase; Fenugreekine; folacin; galactinol; galactomannan; gentianine; gitogenin; graecunin-h; graecunin-n; homoorientin; isovitexin; kaempferol; lecithin; lignin; luteolin; muurolene; myo-inositol; neotigogenin; niacin; nicotinic-acid; oleic-acid; orientin; orientin-arabinoside; p-coumaric-acid; palmitic-acid; protopectin; pyridoxine; quercetin; raffinose; riboflavin; rutin; saponin; selenine; stachyose; stearic-acid; thiamin; threonine; tigogenin; trigofoenosides; trigoforin; trigonellosides; trillin; verbascose; vicenin-1; vicenin-2; vitexin; vitexin-2'-o-p-coumarate; vitexin-7-glucoside; xanthophyll; yamogenin; yamogenin-3,26-biglycoside; and yamogenin-tetrosides.

As used herein, "substantially free" means that any of the other compound present in the composition is no greater than 1.0 wt. % relative to the amount of trigonelline, preferably no greater than 0.1 wt. % relative to the amount of trigonelline, more preferably no greater than 0.01 wt. % relative to the amount of trigonelline, most preferably no greater than 0.001 wt. % relative to the amount of trigonelline.

Yet another aspect of the present disclosure is a method of treating or preventing (e.g., reducing incidence and/or severity) a mitochondria-related disease or a condition associated with altered mitochondrial function in an individual in need thereof or at risk thereof. The method comprises orally administering to the individual a composition consisting essentially of trigonelline or consisting of trigonelline in an amount effective to increase $NAD^+$ biosynthesis.

The mitochondria-related disease or condition can be selected from the group consisting of deleterious effects of aging, stress (e.g., oxidative stress), obesity, overweight, reduced metabolic rate, metabolic syndrome, diabetes mellitus, complications from diabetes, hyperlipidemia, neurodegenerative disease, cognitive disorder, stress-induced or stress-related cognitive dysfunction, mood disorder, anxiety disorder, age-related neuronal death or dysfunction, chronic kidney disease, kidney failure, trauma, infection, cancer, hearing loss, macular degeneration, myopathies and dystrophies, and combinations thereof.

For example, aging is a condition that can be linked to one of the following: oxidative stress, reduced level of glutathione, and lower redox ratio $NAD^+/NADH$. The compositions disclosed herein can treat or prevent these deleterious effects of aging. For example, trigonelline increases $NAD^+$, and the present inventors believe that the increased $NAD^+$ may lead to enhancement of glutathione through redox recycling.

As other examples, depression is linked to low glutathione, and anxiety is linked to oxidative stress. The compositions disclosed herein can treat or prevent these conditions.

These methods can consist essentially of administering the composition consisting essentially of trigonelline or consisting of trigonelline. As used herein, a "method consisting essentially of administering the composition consisting essentially of trigonelline or consisting of trigonelline" means that any additional compound that affects $NAD^+$ production other than the trigonelline is not administered within one hour as the administration of the trigonelline, preferably not administered within two hours as the administration of the trigonelline, more preferably not administered within three hours as the administration of the trigonelline, most preferably not administered in the same day as the administration of the trigonelline. Non-limiting examples of compounds that optionally can be excluded from the method include those disclosed above regarding exclusion from the composition itself.

Another aspect of the present disclosure is a unit dosage form of a composition consisting essentially of trigonelline or consisting of trigonelline, and the composition contains the trigonelline in an amount effective for treatment or prevention of at least condition selected from the group consisting of deleterious effects of aging, diabetes (type I or type II), complications from diabetes (e.g., diabetic dyslipidemia and/or diabetic microvascular complications such as nephropathy, retinopathy, and/or neuropathy), insulin resistance, metabolic syndrome, dyslipidemia, overweight, obesity, overweight, raised cholesterol levels, raised triglyceride levels, elevated fatty acid levels, fatty liver disease (e.g., non-alcoholic fatty liver disease, including with or without inflammation), cardiovascular disease (e.g., heart failure and/or impaired cardiac contractile function), neurodegenerative disease (e.g., from aging), depression, anxiety, decreased/low motivation, impaired cognitive function, myopathy such as statin-induced myopathy, non-alcoholic steatohepatitis, tinnitus, dizziness, alcohol hangover, hearing impairment, osteoporosis, hypertension, atherosclerosis/coronary artery disease, myocardial damage after stress (e.g., from burns or trauma), traumatic brain injury (including concussions), cystic fibrosis, inflammation, cancer, HIV infection stroke, migraine, and brain ischemia.

For example, aging is a condition that can be linked to one of the following: oxidative stress, reduced level of glutathione, and lower redox ratio $NAD^+/NADH$. The compositions disclosed herein can treat or prevent these deleterious effects of aging. For example, trigonelline increases $NAD^+$, and the present inventors believe that the increased $NAD^+$ may lead to enhancement of glutathione through redox recycling.

As other examples, depression is linked to low glutathione, and anxiety is linked to oxidative stress. The compositions disclosed herein can treat or prevent these conditions.

Another aspect of the present disclosure is a method of treating at least one of these conditions, the method comprising administering a therapeutically effective amount of a composition consisting essentially of trigonelline or consisting of trigonelline to the individual having the condition. Another aspect of the present disclosure is a method of preventing at least one of these conditions, the method comprising administering a prophylactically effective amount of a composition consisting essentially of trigonelline or consisting of trigonelline to an individual at risk of the at least one condition.

The composition consisting essentially of trigonelline or consisting of trigonelline can treat or prevent an eye condition resulting directly or indirectly from low GSH levels, including low levels in the lens of the eye that is known for being rich in glutathione. Non-limiting examples of such conditions include cataracts and/or glaucoma, presbyopia (loss of near vision with aging requiring reading glasses), and presbyacusis (loss of hearing with aging, which requires a hearing aid).

Yet another aspect of the present disclosure is a method of delaying off-set of metabolic decline, decreasing oxidative stress, maintaining immune function and/or maintaining cognitive function in a healthy older adult. The method comprises administering an effective amount of a composition consisting essentially of trigonelline or consisting of trigonelline to the healthy older adult.

Yet another aspect of the present disclosure is a unit dosage form of a composition consisting essentially of trigonelline or consisting of trigonelline in an amount effective to promote neurite outgrowth. In a related embodiment, a method of promoting neurite outgrowth in an individual comprises administering to the individual an effective amount of a composition consisting essentially of trigonelline or consisting of trigonelline.

The method of promoting neurite outgrowth can be an in vitro method or an in vivo method. In an embodiment, the promoting of neurite outgrowth comprises inducing neurite outgrowth. For example, neurite outgrowth in a negative control sample may be negligible, while neurite outgrowth in an experimental or treatment sample may be non-negligible. In an embodiment, the promoting of neurite outgrowth comprises enhancing neurite outgrowth. For example, neurite outgrowth in a negative control sample may be non-negligible, while neurite outgrowth in an experimental or treatment sample may be statistically significantly greater than the negative control. Of course, in some embodiments the promoting of neurite outgrowth can encompass both enhancing and inducing.

Yet another aspect of the present disclosure is a unit dosage form of a composition consisting essentially of trigonelline or consisting of trigonelline, and the composition contains an amount of the trigonelline effective for weight management. "Weight management" for an adult (e.g., at least eighteen years from birth) means that the individual has approximately the same body mass index (BMI) after one week of consumption of the composition, preferably after one month of consumption of the composition, more preferably after one year of consumption of the composition, relative to their BMI when consumption of the composition was initiated. "Weight management" for younger individuals means that the BMI is approximately the same percentile relative to an individual of a corresponding age after one week of consumption of the composition, preferably after one month of consumption of the composition, more preferably after one year of consumption of the composition, relative to their BMI percentile when consumption of the composition was initiated.

In a related embodiment, a method of weight management in an individual comprises administering an effective amount of a composition consisting essentially of trigonelline or consisting of trigonelline to the individual.

In another aspect, the present disclosure provides a method of improving cognitive function. The method comprises administering an effective amount of a composition consisting essentially of trigonelline or consisting of trigonelline to an individual. The cognitive function can be selected from the group consisting of perception, memory, attention, speech comprehension, speech generation, reading comprehension, creation of imagery, learning, reasoning, and combinations thereof. In an embodiment, the individual does not have a cognitive disorder; alternatively, the individual has a cognitive disorder. The individual can be elderly and/or can have cognitive decline associated with aging.

Yet another aspect of the present disclosure is a method of improving one or more of fetal metabolic programming for prevention of later development of obesity, overweight and/or diabetes, maternal and fetal health in gestational diabetes, exercise capacity and physical function, quality of life, longevity, memory, cognition, post-traumatic recovery and survival (e.g., post-surgical, post-sepsis, post-blunt or penetrating trauma due to accident or physical assault), or recovery from trauma and surgery. The method comprises administering an effective amount of a composition consisting essentially of trigonelline or consisting of trigonelline to an individual at risk thereof or in need thereof.

In some embodiments, the trigonelline is administered directly to the infant. Additionally or alternatively, the trigonelline can be administered to the pregnant mother during pregnancy to have effects on the fetus indirectly and/or can be administered to the lactating mother t to have effects on the fetus indirectly.

Yet another aspect of the present disclosure is a method of (i) treating or preventing at least one physical state selected from the group consisting of oxidative stress, a condition associated with oxidative stress (e.g., aging and its effects such as skin aging), a reduced level of glutathione, a condition associated with a reduced level of glutathione, or (ii) improving one or more of fetal metabolic programming for prevention of later development of obesity, overweight, pre-diabetes and/or diabetes, maternal and fetal health in gestational diabetes, exercise capacity and physical function, quality of life, longevity, memory, cognition, post-traumatic recovery and survival, or recovery from trauma and surgery. The method comprises administering an effective amount of a composition consisting essentially of trigonelline or consisting of trigonelline to an individual at risk thereof or in need thereof. For example, trigonelline increases $NAD^+$, and the present inventors believe that the increased $NAD^+$ may lead to enhancement of glutathione through redox recycling.

In biology and psychology, the term "stress" refers to the consequence of the failure of a human or other animal to respond appropriately to physiological, emotional, or physical threats, whether actual or imagined. The psychobiological features of stress may present as manifestations of oxidative stress, i.e., an imbalance between the production and manifestation of reactive oxygen species and the ability of a biological system readily to detoxify the reactive intermediates or to repair the resulting damage. Disturbances in the normal redox state of tissues can cause toxic effects through the production of peroxides and free radicals that damage all of the components of the cell, including proteins, lipids, and DNA. Some reactive oxidative species can even act as messengers through a phenomenon called "redox signaling."

In humans, oxidative stress is involved in many diseases. Examples include atherosclerosis, Parkinson's disease, heart failure, myocardial infarction, Alzheimer's disease, schizophrenia, bipolar disorder, fragile X syndrome, and chronic fatigue syndrome.

One source of reactive oxygen under normal conditions in humans is the leakage of activated oxygen from mitochondria during oxidative phosphorylation. Other enzymes capable of producing superoxide (O2-) are xanthine oxidase, NADPH oxidases and cytochromes P450. Hydrogen peroxide, another strong oxidizing agent, is produced by a wide variety of enzymes including several oxidases. Reactive oxygen species play important roles in cell signaling, a process termed redox signaling. Thus, to maintain proper cellular homeostasis a balance must be struck between reactive oxygen production and consumption.

Oxidative stress contributes to tissue injury following irradiation and hyperoxia. It is also suspected to be important in neurodegenerative diseases, including Alzheimer's disease, Parkinson's disease, amyotrophic lateral sclerosis (ALS), and Huntington's disease.

Oxidative stress is also thought to be linked to certain cardiovascular diseases, since oxidation of low-density lipoprotein (LDL) in the vascular endothelium is a precursor to plaque formation. Oxidative stress also plays a role in the ischemic cascade due to oxygen reperfusion injury following hypoxia. This cascade includes both strokes and heart attacks. Oxidative stress has also been implicated in chronic fatigue syndrome.

Moreover, the free radical theory of aging suggests that the biological process of aging results in increased oxidative stress in elderly humans. The ability of a cell to resist the damaging potential of oxidative stress is determined by a vital balance between generation of oxidant free radicals and the defensive array of antioxidants available to the cell. There are multiple antioxidant defense systems and of these, glutathione (GSH) is the most abundant intracellular component of overall antioxidant defenses. GSH, a tripeptide, is synthesized from precursor amino-acids glutamate, cysteine, and glycine in two steps catalyzed by glutamate cysteine ligase (GCL, also known as gamma-glutamylcysteine synthetase, EC 6.3.2.2) and gamma-L-glutamyl-L-cysteine:glycine ligase (also known as glutathione synthetase, EC 6.3.2.3), and GSH synthesis occurs de novo in cells.

In each of the compositions and methods disclosed herein, the composition is preferably a food product, including food additives, food ingredients, functional foods, dietary supplements, medical foods, nutraceuticals, oral nutritional supplements (ONS) or food supplements.

The composition can be administered at least one day per week, preferably at least two days per week, more preferably at least three or four days per week (e.g., every other day), most preferably at least five days per week, six days per week, or seven days per week. The time period of administration can be at least one week, preferably at least one month, more preferably at least two months, most preferably at least three months, for example at least four months. In some embodiments, dosing is at least daily; for example, a subject may receive one or more doses daily, in an embodiment a plurality of doses per day. In some embodiments, the administration continues for the remaining life of the individual. In other embodiments, the administration occurs until no detectable symptoms of the medical condition remain. In specific embodiments, the administration occurs until a detectable improvement of at least one symptom occurs and, in further cases, continues to remain ameliorated.

The compositions disclosed herein may be administered to the subject enterally, e.g., orally, or parenterally. Non-limiting examples of parenteral administration include intravenously, intramuscularly, intraperitoneally, subcutaneously, intraarticularly, intrasynovially, intraocularly, intrathecally, topically, and inhalation. As such, non-limiting examples of the form of the composition include natural foods, processed foods, natural juices, concentrates and extracts, injectable solutions, microcapsules, nano-capsules, liposomes, plasters, inhalation forms, nose sprays, nosedrops, eyedrops, sublingual tablets, and sustained-release preparations.

The compositions disclosed herein can use any of a variety of formulations for therapeutic administration. More particularly, pharmaceutical compositions can comprise appropriate pharmaceutically acceptable carriers or diluents and may be formulated into preparations in solid, semi-solid, liquid or gaseous forms, such as tablets, capsules, powders, granules, ointments, solutions, suppositories, injections, inhalants, gels, microspheres, and aerosols. As such, administration of the composition can be achieved in various ways, including oral, buccal, rectal, parenteral, intraperitoneal, intradermal, transdermal, and intratracheal administration. The active agent may be systemic after administration or may be localized by the use of regional administration, intramural administration, or use of an implant that acts to retain the active dose at the site of implantation.

In pharmaceutical dosage forms, the compounds may be administered as their pharmaceutically acceptable salts. They may also be used in appropriate association with other pharmaceutically active compounds. The following methods and excipients are merely exemplary and are in no way limiting.

For oral preparations, the compounds can be used alone or in combination with appropriate additives to make tablets, powders, granules or capsules, for example, with conventional additives, such as lactose, mannitol, corn starch or potato starch; with binders, such as crystalline cellulose, cellulose functional derivatives, acacia, corn starch or gelatins; with disintegrators, such as corn starch, potato starch or sodium carboxymethylcellulose; with lubricants, such as talc or magnesium stearate; and if desired, with diluents, buffering agents, moistening agents, preservatives and flavoring agents.

The compounds can be formulated into preparations for injections by dissolving, suspending or emulsifying them in an aqueous or non-aqueous solvent, such as vegetable or other similar oils, synthetic aliphatic acid glycerides, esters of higher aliphatic acids or propylene glycol; and if desired, with conventional, additives such as solubilizers, isotonic agents, suspending agents, emulsifying agents, stabilizers and preservatives.

The compounds can be utilized in an aerosol formulation to be administered by inhalation. For example, the compounds can be formulated into pressurized acceptable propellants such as dichlorodifluoromethane, propane, nitrogen and the like.

Furthermore, the compounds can be made into suppositories by mixing with a variety of bases such as emulsifying bases or water-soluble bases. The compounds can be administered rectally by a suppository. The suppository can include a vehicle such as cocoa butter, carbowaxes and polyethylene glycols, which melt at body temperature, yet are solidified at room temperature.

Unit dosage forms for oral or rectal administration such as syrups, elixirs, and suspensions may be provided wherein each dosage unit, for example, teaspoonful, tablespoonful, tablet or suppository, contains a predetermined amount of the composition. Similarly, unit dosage forms for injection or intravenous administration may comprise the compounds in a composition as a solution in sterile water, normal saline or another pharmaceutically acceptable carrier, wherein each dosage unit, for example, mL or L, contains a predetermined amount of the composition containing one or more of the compounds.

Compositions intended for a non-human animal include food compositions to supply the necessary dietary requirements for an animal, animal treats (e.g., biscuits), and/or dietary supplements. The compositions may be a dry composition (e.g., kibble), semi-moist composition, wet composition, or any mixture thereof. In one embodiment, the composition is a dietary supplement such as a gravy, drinking water, beverage, yogurt, powder, granule, paste, suspension, chew, morsel, treat, snack, pellet, pill, capsule, tablet, or any other suitable delivery form. The dietary supplement can comprise a high concentration of the UFA and NORC, and B vitamins and antioxidants. This permits the supplement to be administered to the animal in small amounts, or in the alternative, can be diluted before administration to an animal. The dietary supplement may require admixing, or can be admixed with water or other diluent prior to administration to the animal.

"Pet food" or "pet treat compositions" comprise from about 15% to about 50% crude protein. The crude protein material may comprise vegetable proteins such as soybean meal, soy protein concentrate, corn gluten meal, wheat gluten, cottonseed, and peanut meal, or animal proteins such as casein, albumin, and meat protein. Examples of meat protein useful herein include pork, lamb, equine, poultry, fish, and mixtures thereof. The compositions may further comprise from about 5% to about 40% fat. The compositions may further comprise a source of carbohydrate. The compositions may comprise from about 15% to about 60% carbohydrate. Examples of such carbohydrates include grains or cereals such as rice, corn, milo, sorghum, alfalfa, barley, soybeans, canola, oats, wheat, and mixtures thereof. The compositions may also optionally comprise other materials such as dried whey and other dairy by-products.

In some embodiments, the ash content of the pet food composition ranges from less than 1% to about 15%, and in one aspect, from about 5% to about 10%.

The moisture content can vary depending on the nature of the pet food composition. In a one embodiment, the composition can be a complete and nutritionally balanced pet food. In this embodiment, the pet food may be a "wet food", "dry food", or food of intermediate moisture content. "Wet food" describes pet food that is typically sold in cans or foil bags, and has a moisture content typically in the range of about 70% to about 90%. "Dry food" describes pet food which is of a similar composition to wet food, but contains a limited moisture content, typically in the range of about 5% to about 15% or 20%, and therefore is presented, for example, as small biscuit-like kibbles. In one embodiment, the compositions have moisture content from about 5% to about 20%. Dry food products include a variety of foods of various moisture contents, such that they are relatively shelf-stable and resistant to microbial or fungal deterioration or contamination. Also included are dry food compositions which are extruded food products, such as pet foods, or snack foods for companion animals.

EXAMPLES

The following non-limiting example presents scientific data developing and supporting the concept of a composition consisting essentially of or consisting of trigonelline for cellular nutrition.

Example 1

Enzymatic Quantification of NAD+ Concentration in Human and Zebrafish after Treatment with Trigonelline.

Figure 1:
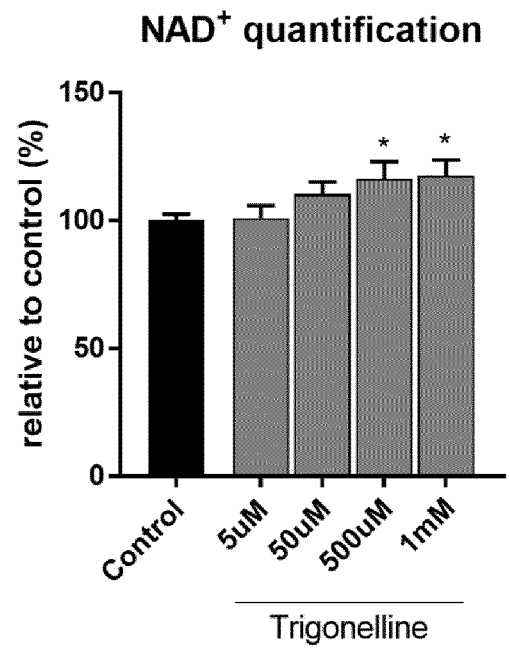
FIG. 1—Enzymatic quantification of NAD+ concentration in Human and Zebrafish upon trigonelline treatment.
Figure 1:
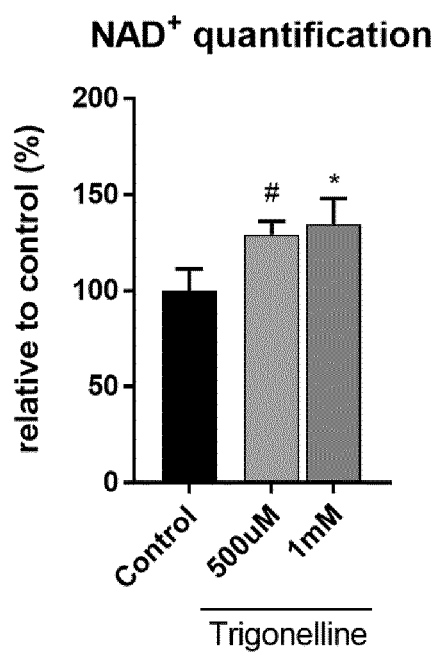

Human primary myoblasts were seeded in 384 well plates at a density of 3'000 cells per well in skeletal muscle growth medium (SKM-M, AMSbio). After one day, the differentiation was induced by a medium change for 4 days using differentiation culture medium (Gibco No. 31330-028). Cells were treated with trigonelline (sigma #T5509) for 6 h. NAD was measured using bioluminescent assay (Promega NAD/NADH-Glo™ #G9071). This is shown in FIG. 1A.

Embryos from wild type zebrafish have been raised at 28° C. under standard laboratory conditions and have been raised at 96 h post-fertilization in 6 well plates (n=20-25). Larvae were treated with trigonelline (sigma #T5509) for 16 h. NAD was measured using colorimetric NAD quantification assay (Biovision NAD/NADH Quantitation Colorimetric Kit #k337-100). This is shown in FIG. 1B.

Example 2

Human Myoblast Differentiation Enhanced by Trigonelline

Human primary myoblasts from two different donors were seeded in 6 well plates at a density of 200'000 cells per well in skeletal muscle growth medium (SKM-M, AMSbio). After one day, the differentiation was induced by a medium change for 4 days using differentiation culture medium (Gibco No. 31330-028). Cells were treated with isotopically labelled trigonelline ($^{13}C$ carbonyl; $3^2H$ on methyl) for 6 h.

Cell extracts were separated on a Vanquish UHPLC+ focused LC system (Thermo Scientific) with a hydrophilic liquid chromatography (HILIC) iHILIC-Fusion(P) column (Hilicon) carrying the dimensions 150×2.1 mm, 5 μm and a guard column (iHILIC-fusion(P), Hilicon) in front. The separation of metabolites was achieved by applying a linear solvent gradient in normal phase at 0.25 mL/min flow rate and 35° C. of temperature. As mobile phase, solvent A was water with 10 mM ammonium acetate and 0.04% (v/v) ammonium hydroxide, pH~9.3, and solvent B was acetonitrile.

The eluting metabolites were analyzed with an Orbitrap Fusion Lumos mass spectrometer (Thermo Scientific) with a heated electrospray ionization (H-ESI) source in positive and negative mode at a resolution of 60,000 at m/z of 200. Instrument control and data analysis were conducted using Xcalibur (Thermo Scientific).

Figure 2:
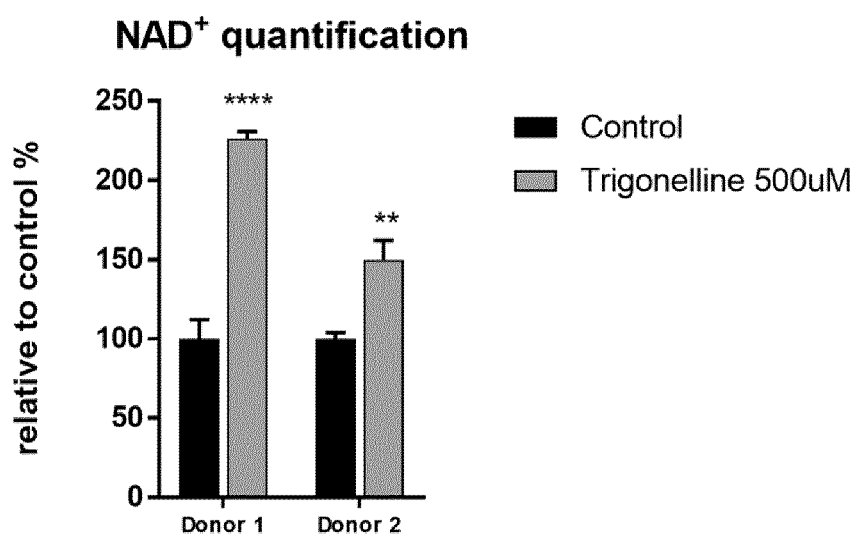
FIG. 2—Liquid chromatography-Mass spectrometry measurement of NAD+ concentration and Stable Isotope label incorporation into NAD+ upon isotopically labeled trigonelline treatment in Myotubes.
Figure 2:
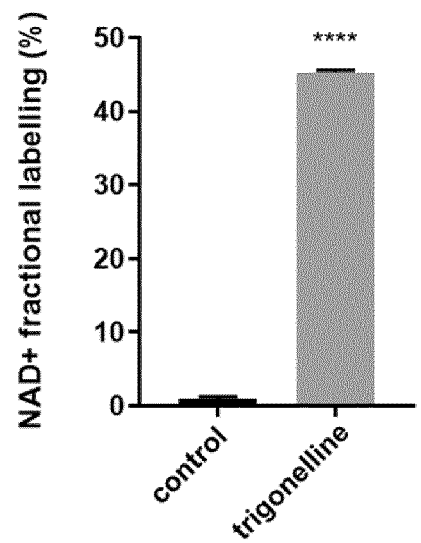
Figure 2:
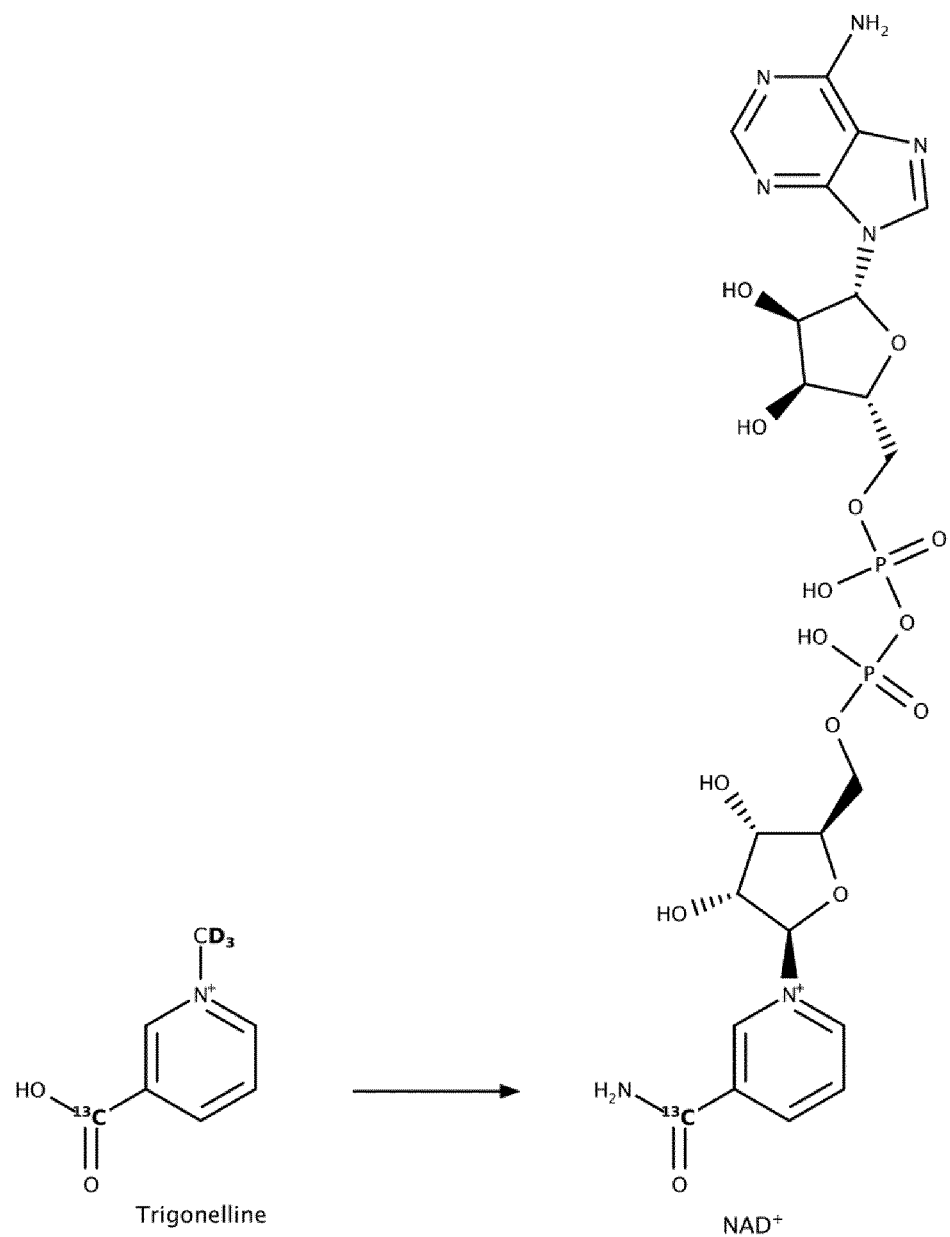

FIG. 2A shows the enhancement of NAD+ levels upon trigonelline treatment at 500 μM in human myotubes. Trigonelline acts as a NAD+ precursor, as shown in FIG. 2B.

Upon labelled trigonelline ($^{13}$C-carbonyl, C$^2$H$_3$) treatment at 500 μM in this human cell model, after 6 h, the distribution of isotopes differs from the control. There is an explicit incorporation of $^{13}$C-atoms from the precursor (trigonelline ($^{13}$C-carbonyl, C$^2$H$_3$)) into NAD+(NAD+($^{13}$C-carbonyl)). Expressed as % of $^{13}$C-enrichment, [$^{13}$C]-isotopic enrichment of NAD+ is higher (45%) as compared to NAD+ in baseline conditions. The label incorporation was corrected for natural abundance using AccuCore (Su et al Anal Chem 2017). The structures of the isotopically labelled tracer, trigonelline ($^{13}$C-carbonyl, C$^2$H$_3$), and the formed isotopically labelled NAD+($^{13}$C-carbonyl) are shown in FIG. 2C.

Example 3

Figure 3:
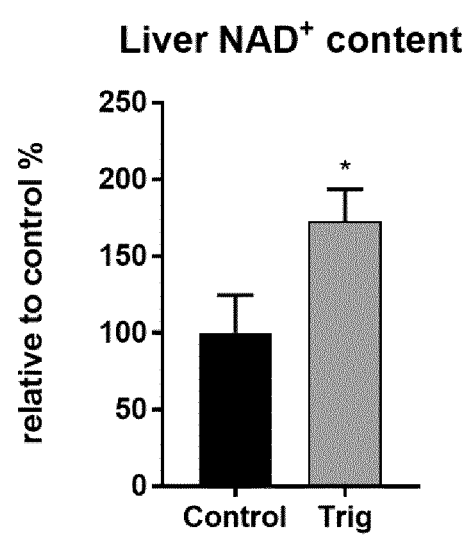
FIG. 3—Enzymatic quantification of NAD+ uptake in Liver and Muscle upon trigonelline treatment. Enzymatic quantification of NAD+ in mice 120 minutes after receiving 250 mg/kg trigonelline by oral gavage (FIGS. 3A, 3C) or intraperitoneal administration (FIGS. 3B, 3D). * indicates difference from the control, unpaired t-test with $p<0.05$. Data are presented as Mean+/−SEM.
Figure 3:
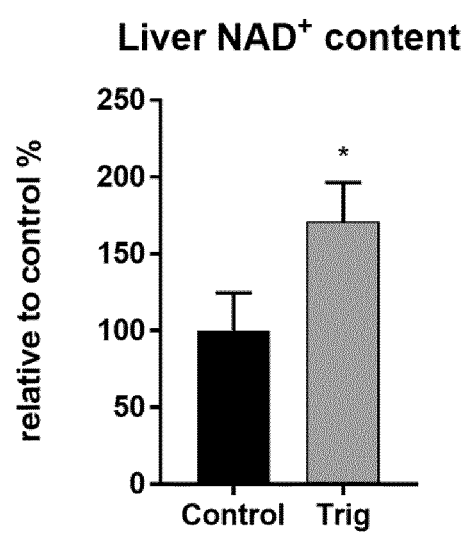
Figure 3:
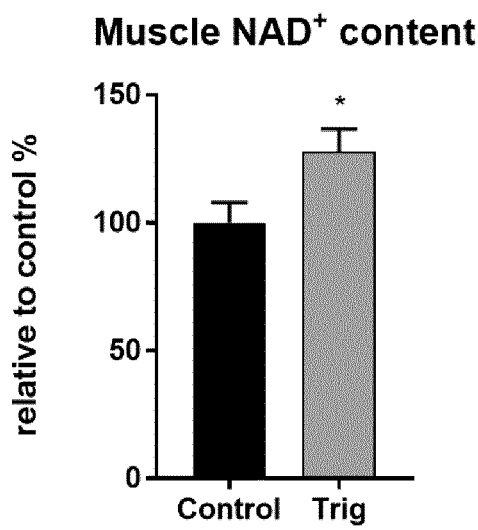
Figure 3:
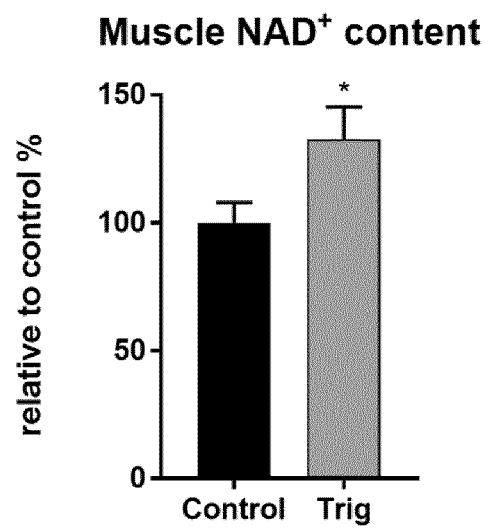

Liver and Muscle NAD+ Concentration after Oral or Intraperitoneal Administration of Trigonelline 10 weeks C57BL/6JRj male mice were fed a diet (Safe 150) and then received oral gavage or intraperitoneal injection of trigonelline (250 mg/kg, n=5/group). Tissues were harvested and flash frozen in liquid nitrogen after 120 minutes of treatment. NAD was measured in gastrocnemius muscle and in liver using colorimetric NAD quantification assay (Biovision NAD/NADH Quantitation Colorimetric Kit #k337-100). FIG. 3 shows the enzymatic quantification of NAD+ in mice 120 minutes after receiving 250 mg/kg trigonelline by oral gavage (FIGS. 3A, 3C) or intraperitoneal administration (FIGS. 3B, 3D).

Example 4

Figure 4:
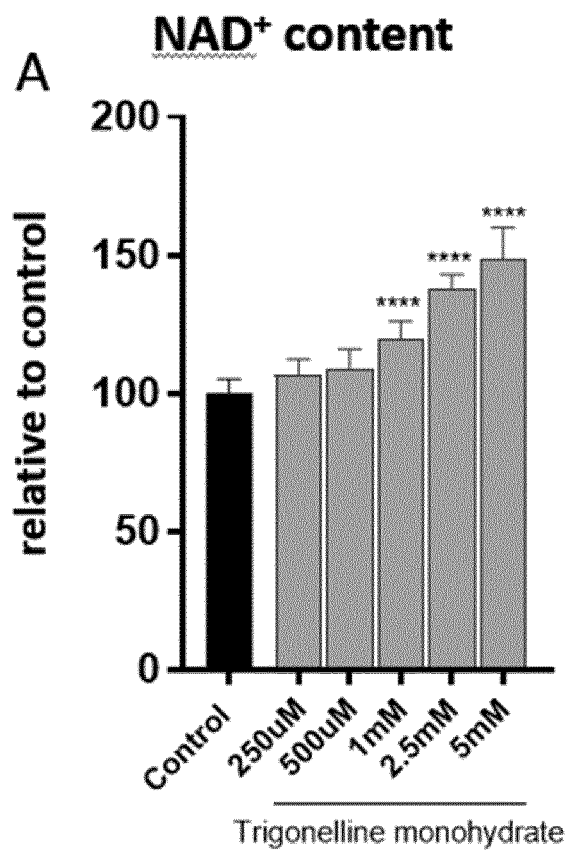
FIG. 4—NAD+ measured in human primary myoplasts after treatment of chemically synthesized trigonelline or fenugreek seed extract enriched in trigonelline
Figure 4:
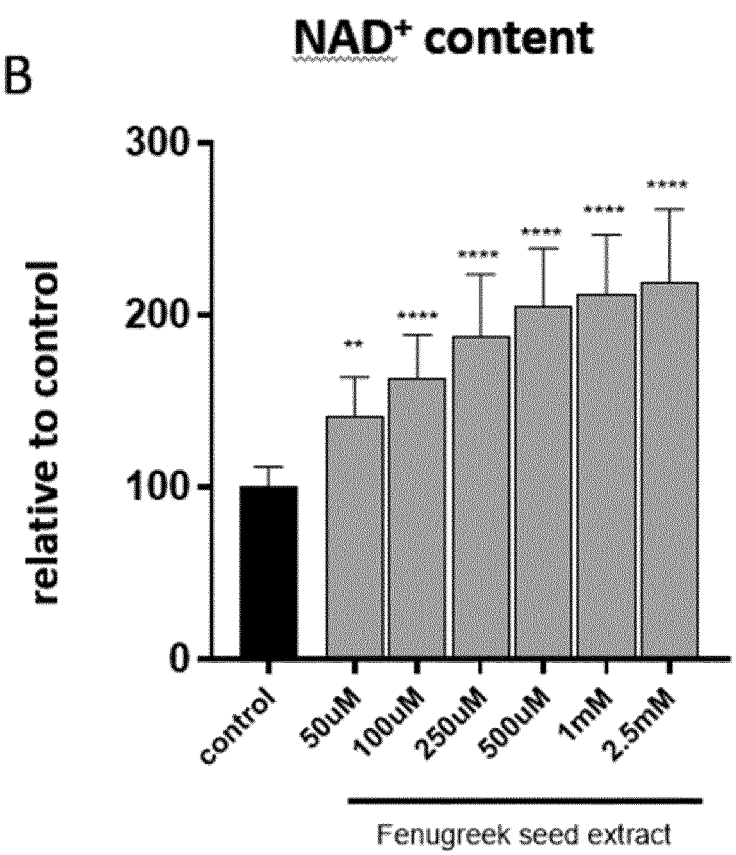

NAD$^+$ Measured in Human Primary Myoplasts after Treatment with Chemically Synthesized Trigonelline or Fenugreek Seed Extract Enriched in Trigonelline Human primary myoblasts were seeded in 96 well plates at a density of 12'000 cells per well in skeletal muscle growth medium (SKM-M, AMSbio). After one day, the differentiation is induced by a medium change for 4 days. Cells were treated with synthetic trigonelline monohydrate (FIG. 4A) or with Fenugreek seed extract enriched in trigonelline containing 40.45% trigonelline (FIG. 4B) for 16 h at difference doses. NAD$^+$ was measured using colorimetric NAD$^+$ quantification assay (Biovision NAD$^+$/NADH Quantitation Colorimetric Kit #k337-100).

This experiment demonstrated that both the chemically synthesized trigonelline and the trigonelline from the Fenugreek seed extract showed a significant increase in NAD$^+$ content compared to the control. For the Fenugreek seed extract, it was more potent at lower doses than the chemically synthesized trigonelline.

Example 5

NAD$^+$ Measured in Mouse Liver after Treatment with Chemically Synthesized Trigonelline or Fenugreek Seed Extract Enriched in Trigonelline 10 weeks C57BL/6JRj male mice received trigonelline (sigma #T5509) or fenugreek seed extract enriched in trigonelline (40.45% trigonelline) by oral gavage (equimolar of 300 mg/kg trigonelline, n=8/group). After 120 minutes treatment, the liver was harvested and flash frozen in liquid nitrogen. NAD$^+$ was measured in liver using an enzymatic method adapted from Dall, M., et al., Mol Cell Endocrinol, 2018. 473: p. 245-256.

This experiment demonstrated that both the chemically synthesized trigonelline and the trigonelline from the Fenugreek seed extract showed a significant increase in NAD$^+$ content in the liver compared to the control.

Example 6

Tests in *C. elegans* to Measure Survival, Speed, Mobility and Stimulated Mobility Worm lifespan tests were performed using about 100 animals per condition and scored manually every other day. Trigonelline treatment and experimental measurements were started at Day 1 of wild type N2 worm adulthood, in a regimen of chronic exposure till experiments termination. FIG. 7A demonstrates the mean survival of the worms in days comparing the control to the trigonelline treated worms with the trigonelline treated worms. Survival curve of *C. elegans* treated with 1 mM trigonelline chloride increases lifespan by 21%.

*C. elegans* mobility test was performed using the Movement Tracker software (Mouchiroud, L. et al. Curr Protoc Neurosci 77, 8.37.1-8.37.21 (2016)). The experiments were repeated at least twice. Trigonelline treatment and experimental measurements were started at Day 1 of wild type N2 worm adulthood, in a regimen of chronic exposure till experiments termination.

FIG. 7B measured the mean speed measured during spontaneous mobility assay performed from day 1 adulthood in 1 mM trigonelline chloride treated worms compared to controls. *C. elegans* treated with 1 mM trigonelline chloride increased the mean speed compared to the control.

FIG. 7C showed that the distance travelled during the spontaneous mobility assay in advanced aging phase was significantly increased in *C. elegans* treated with 1 mM trigonelline chloride compared to control.

45 to 60 worms per condition were manually scored for mobility after poking. Worms that were unable to respond to any repeated stimulation were scored as dead. Results were representative of data obtained from at least two independent experiments. Trigonelline treatment and experimental measurements were started at Day 1 of wild type N2 worm adulthood, in a regimen of chronic exposure til experiments termination.

FIG. 7D showed that the stimulated mobility score assessed for day 8 and day 11 old worms indicated that *C. elegans* treated with 1 mM trigonelline chloride were more responsive to a physical stimulus than the control.

*,** indicate difference from the control, Student test, with $p<0.05$, $p<0.01$, respectively.

Example 7

Structural Integrity of Myofibrils and Myosin Improved with Treatment Using Trigonelline Age-related morphological changes in myosin structure are typically observed in high-salt ATPase activities of myofibrils and myosin wherein the myofibril structure becomes less organized with advanced age.

RW1596 (myo-3p::GFP) worms were collected at Day 1 (young adults) and at Day 11 (aged animals) for muscle integrity assessment. Worms were immobilized with tetramisole and analyzed by confocal microscopy, to assess the muscle fibers morphology shown by GFP fluorescence imaging. Trigonelline treatment with 1 mM trigonelline chloride and experimental measurements were started at Day 1 of wild type N2 worm adulthood, in a regimen of chronic exposure till experiments termination.

Upon examination of the morphological structure of using fluorescence microscopy of GFP-tagged myosin, we were able to see an improved more organized myofibrillar structure with the trigonelline treated 11 day old worms compared to the age matched control worms.

Example 8

Ratio of Mitochondrial to Nuclear DNA in Control and Trigonelline Treated *C. elegans*

Absolute quantification of the mtDNA copy number in wild type N2 worms was performed by real-time PCR. Relative values for nduo-1, and act-1 were compared within each sample to generate a ratio representing the relative level of mitochondrial DNA per nuclear genome. The average of at least two technical repeats was used for each biological data point. Each experiment was performed on at least ten independent biological samples (individual worms). Trigonelline treatment with 1 mM trigonelline chloride and experimental measurements were started at Day 1 of wild type N2 worm adulthood, in a regimen of chronic exposure till experiments termination.

FIG. 8 shows the ratio of a mitochondrial-encoded gene (nduo-1) represented as relative to a nuclear-encoded gene (act-1) in day 8 old worms. *indicate difference from the control, Student test, with $p<0.05$. Data are presented as Mean+/−SD In the trigonelline treated group, the mitochondrial expression relative to the nuclear expression was higher than in the control group.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A composition comprising trigonelline, wherein trigonelline is chemically synthesized and contains at least about 90% trigonelline for use in treating or preventing a mitochondria-related disease or a condition associated with altered mitochondrial function in an individual in need thereof or at risk thereof, in an amount effective to increase NAD+ biosynthesis in one or more cells that are part of at least one body part selected from the group consisting of a liver, a kidney, a brain, and a skeletal muscle.

2. The composition of claim 1, wherein the composition is selected from the group consisting of a food product, a food supplement, an oral nutritional supplement (ONS), a medical food, and combinations thereof.

3. A unit dosage form of a composition consisting essentially of trigonelline, wherein the trigonelline is chemically synthesized and contains at least about 90% trigonelline, the unit dosage form contains an amount of the trigonelline effective to treat or prevent a mitochondria-related disease or a condition associated with altered mitochondrial function in an individual in need thereof or at risk thereof.

4. The unit dosage form of claim 3, which is selected from the group consisting of a food product, a food supplement, an oral nutritional supplement (ONS), a medical food, and combinations thereof.

5. The unit dosage form of claim 3, wherein the composition is formulated for enteral administration.

6. The composition of claim 1, wherein the composition is formulated for enteral administration.

7. The composition of claim 1, wherein the composition contains at least about 98% trigonelline.

8. The composition of claim 1, wherein the composition is substantially free of any additional compound that affects NAD+production other than the trigonelline.

9. The unit dosage form of claim 3, wherein the composition contains at least about 98% trigonelline.

\* \* \* \* \*